No. 832,203. PATENTED OCT. 2, 1906.
E. KÖHLER & R. PETZOLD.
CALIPERS.
APPLICATION FILED JUNE 25, 1904.
2 SHEETS—SHEET 1.
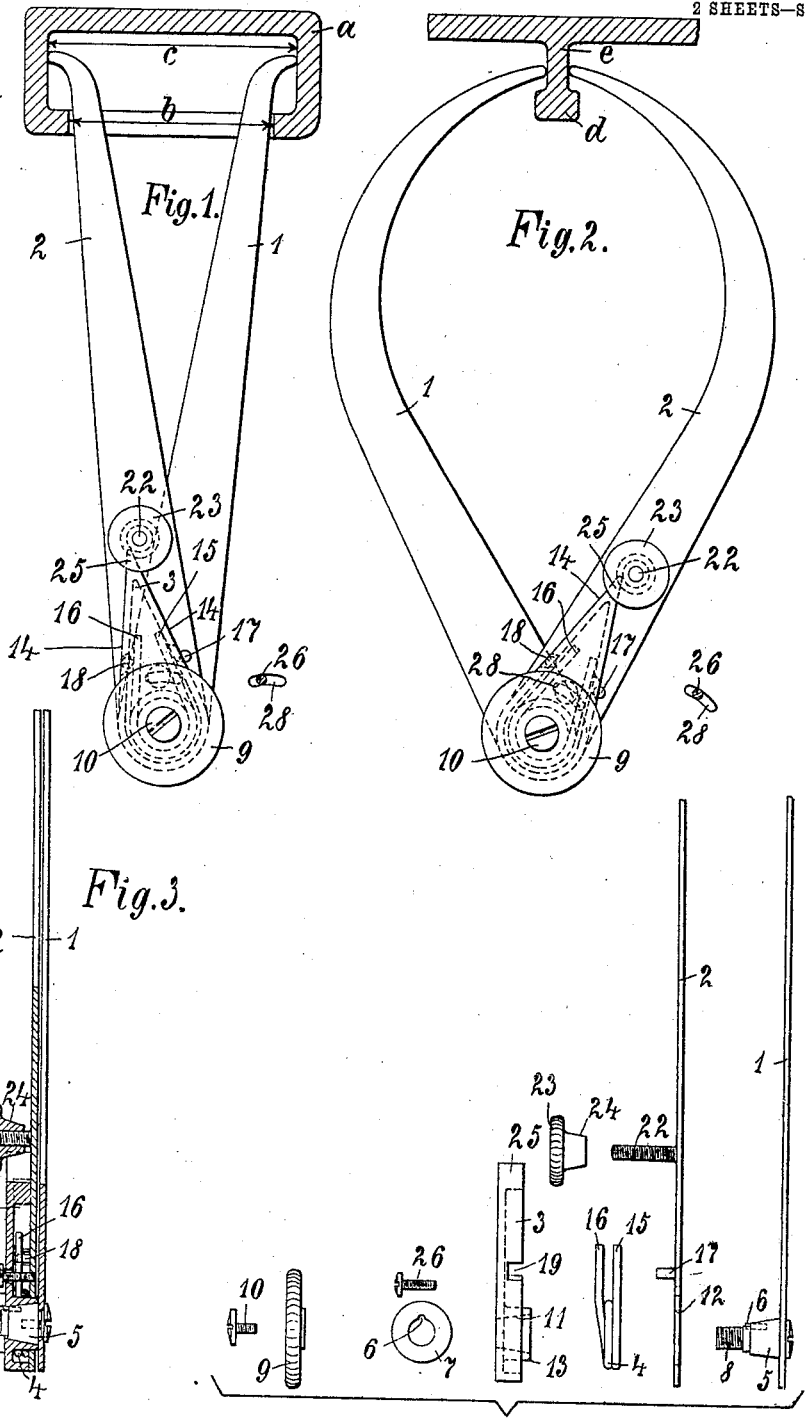

No. 832,203. PATENTED OCT. 2, 1906.
E. KÖHLER & R. PETZOLD.
CALIPERS.
APPLICATION FILED JUNE 25, 1904.

2 SHEETS—SHEET 2.

Witnesses.
F. Heeren
L. Waldman

Inventors
Emil Köhler
Richard Petzold
by B. Singer
atty.

UNITED STATES PATENT OFFICE.

EMIL KÖHLER AND RICHARD PETZOLD, OF CHEMNITZ, GERMANY; SAID PETZOLD ASSIGNOR TO SAID KÖHLER.

CALIPERS.

No. 832,203.  Specification of Letters Patent.  Patented Oct. 2, 1906.

Application filed June 25, 1904. Serial No. 214,173.

*To all whom it may concern:*

Be it known that we, EMIL KÖHLER and RICHARD PETZOLD, subjects of the German Emperor, residing at Chemnitz, in the Empire of Germany, have invented certain new and useful Improvements in Calipers, of which the following is a specification.

The invention relates to measuring instruments or calipers of the class having pivotally-united measuring-legs adapted to be inserted within and applied to the exterior of hollow or solid bodies in ascertaining the dimensions thereof.

Our invention will be more fully described in connection with the accompanying drawings and will be more particularly pointed out in the appending claims.

Figure 6:
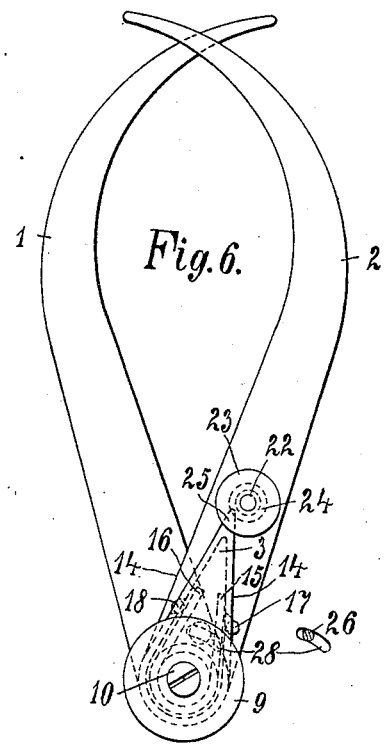
Figure 7:
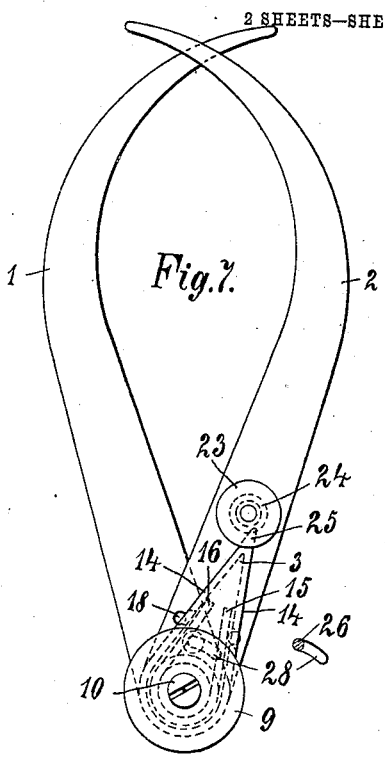
Figure 5:
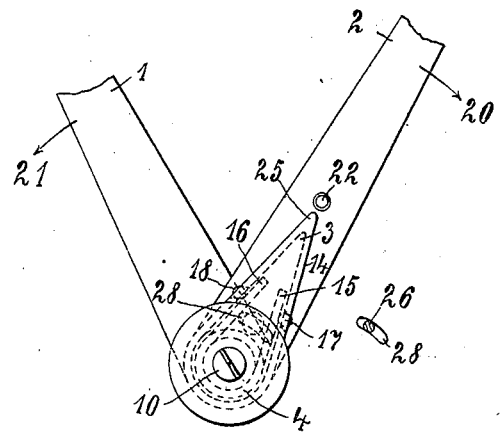

Figure 1 illustrates a form of caliper equipped with our improved restoring device and illustrating the manner of taking internal measurements of a hollow body in which the entrance to the recess or cavity is of less size than the portion to be measured. Fig. 2 shows a form of our improved caliper adapted for external measurements of solid bodies where the portion to be measured is located between parts of increased size. Fig. 3 is a sectional view on line 3 3 of Fig. 1. Fig. 4 shows in detached views the various parts constituting our improved caliper. Fig. 5 illustrates one end of the caliper, showing the restoring device out of gear with the caliper-legs. Fig. 6 illustrates the restoring device in gear and the legs of the caliper crossed in a manner to take internal measurements. Fig 7 illustrates the legs of the caliper in the position shown in Fig. 6 with the restoring device in a different adjustment.

Like characters of reference designate similar parts throughout the different figures in the drawings.

Great difficulty has heretofore been encountered with calipers of the prior art in taking external measurements of bodies wherein the parts to be measured are surrounded by portions of increased size. For instance, in measuring the thickness of a web of an I-beam where the ends of the beam are inaccessible the flanges thereof present obstacles over which the legs of the calipers cannot be passed until they are expanded, which results in losing the measured adjustment.

In taking external dimensions of a hollow body provided with a bore or recess in which the entrance thereto is smaller than the portion to be measured, or in cases where any obstacle is present restricting the passage or opening, it is impossible to withdraw the caliper without collapsing its legs, and thus losing the dimension-adjustment of the same. Therefore measurements of this character have heretofore been secured by the use of other forms of measuring instruments. These difficulties are not experienced in taking dimensions of parts which are so located that the caliper-legs may be withdrawn without changing the measured adjustment, and measurements of this class will hereinafter be referred to as "simple" or "direct" measurements, while measurements wherein the caliper-legs have to be expanded or collapsed after the measuring-adjustment has been effected will be referred to as "obstacle" measurements.

One object of our invention is the provision of a restoring device for calipers adapted to restore the legs of the same to the dimension or measured adjustment when movement of said legs is necessary in withdrawing the caliper from the part measured.

A further object is to provide a restoring device which may be thrown into and out of gear with the legs of said calipers.

A still further object is to provide a tapered or conical nut adapted to coöperate with the restoring device in a manner to permit the operator to secure a fine and accurate adjustment of the measuring-tips of the caliper-legs with respect to the parts to be measured.

In the drawings is shown a measuring instrument or caliper having companion measuring-legs 1 and 2, pivotally united by a pivot-bolt 5. Said pivot and leg 1 are rigidly united by a screw 5ª, the shank of which is secured within the pivot 5 and the head of which eagages leg 1 and holds the same in place. Said pivot is provided with a conical portion on which is mounted a detent or arm 3, preferably of hollow formation and having an annular flange, which is provided with a conical bore 11, adapted to engage the conical portion of said pivot 5. Said hollow arm 3 is open on one side and is provided with lateral walls 14, connected by an outer wall or web 3ª, the said walls 14 converging at one end of said arm to a chisel-edge 25 and at the other end forming a hollow chamber around and concentric with the flange 13. The said flange 13 preferably extends a slight distance beyond the outer margin of the walls 14, the said extension constituting a bearing for leg 2. As will be seen by reference to Fig. 3, the lower end of leg 2 is provided with an aperture 12 equal to the diameter of the flange 13, said leg being interposed between the arm 3 and leg 1 when the parts are assembled. The arm 3 and legs 1 and 2 are locked together and normally held in working proximity by the thumb-nut 9, which operates upon the outer reduced and threaded end 8 of the pivot-bolt 5. There is interposed between the thumb-nut 9 and the arm 3 a washer 7, which is keyed to the pivot-bolt 5 by a key or feather 6. The conical portion of the bolt 5 is slightly less in length than the bore 11, and by reference to Fig. 3 it will be seen that the thumb-nut 9 forces the washer 7 into engagement with the detent-arm 3, the said washer being at all times free from engagement with the end or shoulder of the conical pivot. It would be clear that if the washer 7 were permitted to rotate freely with the thumb-nut 9 when the latter is tightened the said washer would tend to move the detent-arm 3 laterally. When the nut 9 is screwed down upon the threaded part 8, the wall of bore 11 will be forced tightly against the conical periphery of the pivot 5, serving to frictionally lock the leg 1 and arm 3 together. This permits free movement of the leg 2, inasmuch as the conical bore in the flange 13 is of the required size to permit the arm 3 to be thrust backwardly upon the pivot 5 only a sufficient distance to hold legs 1 and 2 in close working proximity, the said legs not being tightly impinged against each other at any time. In order to prevent the thumb-nut 9 from being accidentally unscrewed or turned outwardly and off from the threaded portion 8 when it is desired to release engagement of the detent 3 and leg 1, a screw 10 is provided which enters the outer end of the part 8, the head of said screw being of slightly greater diameter than said part 8 and serving as a stop, limiting outward movement of the nut 9, as will be clearly seen in Fig. 3. It will also be clear from the foregoing how the arm 3 and leg 1 may be frictionally locked together, causing the one to move with the other, and that the leg 2 is free to rotate upon the annular flange 13 when said parts are locked.

We will now describe the means whereby the leg 2 is yieldingly held in engagement with the detent or arm 3. A threaded stud 22, rigidly secured on leg 2, serves as a mounting for a micrometer or adjusting-nut 24. Said nut is provided with a knurled flange 23 and a main body portion of conical formation. The outer end 25 of the detent is engaged by the conical body portion of the nut 24, and said engagement is effected and maintained by a restoring-spring 4, which in the preferred construction is wound about the annular surface and is provided with upwardly-projecting end portions 15 and 16. Said spring is entirely inclosed by the hollow detent-arm 3, the upper projecting ends 15 and 16 of the spring engaging either of the inner faces of the side walls 14. Studs 17 and 18, rigidly secured to leg 2, are permitted to engage the ends 15 and 16 of the spring 4 by means of notches 19 formed in the walls 14 of the detent-arm, as clearly shown in Fig. 4. The legs or ends 15 and 16 of the spring 4 when the nut 24 is entirely removed or is turned upwardly in a position out of the path of said arm 3 will engage the studs 17 and 18 and will be slightly out of engagement with the walls 14, as shown in Fig. 5. Said spring will, however, maintain the leg 2 and the arm 3 in substantially centrally alined positions with respect to each other. When the nut 24 is turned downwardly upon the stud 22 and the detent-arm 3 and leg 1 are locked together by nut 9, leg 2 will be forced to one side of nut 24 against the resistance of the spring 4. As shown in Fig. 1, the nut 24 engages the arm 3 on the right-hand side thereof. Thus the stud 18 is moved inwardly against the leg 16 of the spring, forcing it out of engagement with the arm 3 on the left-hand side. A corresponding movement of the stud 17 permits the end 15 to engage the arm 3 and release engagement of the spring with said stud. It will be seen that when the nut 24 is screwed downwardly, so that its largest diameter engages the arm 3, the leg 2 will be moved slightly to the right, and when said nut 24 is screwed upwardly, so that its smaller diameter engages the arm 3, the leg 2 will be moved slightly to the left. This slight movement effected by turning the nut 24 permits a fine and accurate adjustment of the tips of said legs 1 and 2 with the part measured, and consequently a more accurate measurement, as will hereinafter more fully appear.

By further reference to Fig. 1, as shown in dotted line, it will be seen that leg 2 may be grasped by the hand of the operator and swung toward leg 1 without turning the nut 24, inasmuch as no stop or resistance is offered to such movement except by the end 16 of the spring 4. This movement permits withdrawal of the caliper. A limited play is provided for said leg in the form of a stop-pin 26 and slot 28, the pin 26 in the form shown being a headed machine-screw rigidly secured to leg 2 and working in the slot 28, formed in arm 3. The major portion of said slot extends at one side of the center of said arm to the right, thereby permitting said leg 2 a greater amount of play to the right than to the left.

We will now describe the manner in which an internal dimension of the part a (shown in Fig. 1) is taken. Assuming that the caliper had been previously adjusted, the operator first releases leg 2 and arm 3 from a locked position by turning the thumb-nut 9. The caliper-legs are then crossed, so that their outer or measuring tips project in opposite directions. The nut 24 is turned upwardly upon the stud 22, and after the arm 3 is free it will occupy a position similar to that shown in Fig. 5. Said arm 3 is then swung to the left of a central position and the nut 24 turned downwardly, so that its periphery engages the right-hand side of said arm, in which position said arm 3 and leg 2 are yieldingly locked together, while leg 1 is free, owing to the fact that the end 9 occupies an outer position upon the stud 8. Assuming that the operator desires to take the dimension indicated by $c$ of the part $a$, Fig. 1, the caliper-legs 1 and 2 will be brought together and passed through the entrance indicated by $b$, whereupon the legs will be separated until the measuring-tips come in contact with the inner surface marked by line $c$. The nut 9 will then be turned down upon the washer 7, forcing the conical bore 11 tightly upon the pivot 5 and locking arm 3 and leg 1 together. Arm 3 and leg 1 will now act together irrespective of leg 2. The measuring-tips of legs 1 and 2 are now engaged with the part $a$; but their engagement may be relatively tight or loose and the ends of said legs may not be diametrically opposite, in which case an accurate measurement would not be effected. The slight movement necessary to effect accurate adjustment of legs 1 and 2 is then brought about by turning the tapered nut 24 up and down on the threaded stud 22 until the measuring-tips slightly touch the walls of the part $a$. Assuming that the operator has secured an exact measured adjustment of the legs 1 and 2, he withdraws the caliper-legs from the part $a$ by collapsing or swinging said leg 2 toward leg 1. This movement is permitted because leg 2 is yieldingly held in the dimension-adjustment only by the spring end 16 bearing upon the stud 18, said spring allowing the stud 18 to pass through the notch 19 and well into the arm 3. Movement of the leg 2 toward leg 1 is limited by the pin 26 traveling in the slot 28, as hereinbefore described—that is, the collapsing or expanding movement of said legs in the preferred construction is always limited by the slot 28 and pin $2^a$. It will be obvious, however, that this slot can be made of any length and that it could in some embodiment be entirely dispensed with. It will also be noted that a slight play for leg 2 is also afforded by said slot to the left when the parts are in the position shown in full lines in Fig. 1, this play being provided in case it becomes necessary to spread legs 1 and 2. According to the adjustment shown in Fig. 1, the pin 26 is not in contact with the end of the slot 28 at the left, which position would indicate that nut 24 is turned downwardly, so that its greatest diameter engages the arm 3. Should the nut be turned upwardly until its smallest diameter engages said arm 3, the pin 26 would be moved to the left of said slot in a position to engage the left end thereof. It will be understood that the same adjustment of the parts may be effected when the caliper is adjusted to take external measurements.

The foregoing describes the adjustment when the caliper is used for taking internal and external obstacle measurements. We will now describe the adjustment when the caliper is used in taking simple or direct measurements, reference being had to Fig. 7. While in Fig. 7 the legs of the caliper are crossed, as in Fig. 6, for taking internal measurements, it will be understood that the adjustment of the detent-arm for simple measurements would be the same when the caliper-legs are spread for external measurements, leg 2 moved in a position so that the nut 24 engages the left-hand side of the detent 3, this change being effected to limit movement of leg 2 to the left, its movement to the right being limited by the detent. By reference to the drawings it will be seen that pin 26 occupies an extreme end position in the slot 28, the leg 2 thereby being prevented from moving in either direction. In this position the nut 24 will have been turned downwardly on the stud 22, and any movement that may be permitted for fine adjustment will be effected by turning the screw 24 upwardly upon the stud. Also in this position simple or direct measurements may be taken and a fine graduation or adjustment of the measuring-tips of the caliper-legs is possible, while with the ordinary simple form of pivoted calipers it is very difficult to secure accurate adjustment of the caliper-legs upon the part to be measured. In Fig. 5 the nut 24 is shown entirely removed from the stud, in which position the caliper may be used as a simple form of instrument without the adjusting-nut or other features. In this view it will be seen that the ends 15 and 16 of the springs engaging the studs 17 and 18 on the leg 2 serve normally to hold the arm 3 and leg 2 in positions of central alinement with respect to each other.

It will be noted that in the form of caliper herein shown the legs (after being adjusted to the external or internal diameter to which the points are to be applied) are capable of a relatively extended movement to avoid obstacles tending normally to prevent withdrawal of the calipers from the part measured. The term "relatively extended" is not used and is not intended to broadly include minute or limited adjustments, as means for effecting such adjustment of caliper-legs is known.

The utility and advantages of our improved caliper over like instruments of the prior art will be obvious from the foregoing, and while we have herein shown and described a single embodiment of our invention the same may obviously be changed without departing from the spirit of the invention.

Therefore what we claim, and desire to secure by Letters Patent, is—

1. A measuring instrument or caliper comprising two adjustable companion measuring-legs, a pivot rigidly secured to one of said legs and having a projecting conical portion, a detent-arm provided with a flange having a conical bore adapted to engage said pivot, said flange serving as a bearing on which the other of said legs is loosely mounted, a thumb-nut holding said detent in locking engagement with said pivot and permitting free and relatively extended movement of said loosely-mounted leg, a conical nut adjustably mounted on said loosely-mounted leg, and a spring holding said nut in engagement with said detent.

2. A measuring instrument or caliper comprising two adjustable companion measuring-legs, a pivot rigidly secured to one of said legs and having a projecting conical portion, a stop on the other of said legs, a detent-arm provided with an annular flange having a conical bore adapted to engage said pivot and serving as a bearing on which the other of said legs is loosely mounted, a thumb-nut holding said detent in locking engagement with said pivot, and permitting free and relatively extended movement of said loosely-mounted leg, and a spring normally holding said stop in engagement with said detent.

3. A measuring instrument or caliper comprising two adjustable companion measuring-legs, a pivot rigidly secured to one of said legs and having a projecting conical portion, a detent-arm provided with a flange having a conical bore adapted to engage said pivot, said flange serving as a bearing on which the other of said legs is loosely mounted, a thumb-nut holding said detent in locking engagement with said pivot and permitting free and relatively extended movement of said loosely-mounted leg, a stop removably mounted on said loosely-mounted leg and adapted for engagement with said detent, and a spring normally holding the stop in engagement with said detent.

4. A measuring instrument or caliper comprising two adjustable companion measuring-legs, a pivot rigidly secured to one of said legs and having a projecting conical portion, a stop on the other of said legs, a detent-arm provided with an annular flange having a conical bore adapted to engage said pivot said flange serving as a bearing on which the other of said legs is loosely mounted, a thumb-nut holding said detent in locking engagement with said pivot and permitting free and relatively extended movement of said loosely-mounted leg, a stop on said loosely-mounted leg adapted for engagement with said detent, and a spring normally holding said stop in engagement with said detent.

5. A measuring instrument or caliper comprising two adjustable companion measuring-legs, a pivot rigidly secured to one of said legs and having a projecting conical portion, a detent-arm provided with a flange having a conical bore adapted to engage said pivot, said flange serving as a bearing on which the remaining measuring-leg is loosely mounted, a thumb-nut holding said detent in locking engagement with said pivot, and permitting free and relatively extended movement of said loosely-mounted leg, and a stop adjustably mounted on said loosely-mounted leg and adapted for engagement with said detent.

6. A measuring instrument or caliper comprising two adjustable companion measuring-legs, a pivot rigidly secured to one of said legs and having a projecting conical portion, a detent-arm provided with a flange having a conical bore adapted to engage said pivot, said flange serving as a bearing on which the remaining measuring-leg is loosely mounted, a locking-nut holding said detent-arm and said first-mentioned leg in frictional engagement and permitting free and relatively extended movement of said loosely-mounted leg, and a conical nut adjustably mounted on said loosely-mounted leg.

7. A measuring instrument or caliper comprising two adjustable companion measuring-legs, a pivot rigidly secured to one of said legs and having a projecting conical portion, a detent-arm provided with an annular flange having a conical bore adapted to engage said pivot, said flange serving as a bearing on which the other of said legs is loosely mounted, a thumb-nut holding said detent in locking engagement with said pivot and permitting free and relatively extended movement of said loosely-mounted leg, and a stop on said loosely-mounted leg adapted for engagement with said detent.

8. A measuring instrument or caliper comprising adjustable companion measuring-legs, a pivot rigidly secured to one of said legs and having a projecting conical portion, a detent-arm provided with a flange having a conical bore adapted to engage said pivot, said flange serving as a bearing on which the other of said legs is loosely mounted, a thumb-nut holding said detent in locking engagement with said pivot and permitting free and relatively extended movement of said loosely-mounted leg, and a stop removably mounted on said loosely-mounted leg and adapted for engagement with said detent.

9. A measuring instrument or caliper comprising two companion measuring - legs, a pivot rigidly secured to one of said legs having a projecting conical portion, a detent-arm provided with an annular flange having a conical bore adapted to engage said pivot, said flange serving as a bearing on which the other of said legs is loosely mounted, a thumb-nut holding said detent in locking engagement with said pivot and permitting free and relatively extended movement of said loosely-mounted leg, a stop on said loosely-mounted leg adapted for engagement with said detent-arm, and a pin on said loosely-mounted leg engaging a slot in said detent.

10. A measuring instrument or caliper comprising two companion measuring - legs, a pivot rigidly secured to one of said legs and having a projecting conical portion, a slotted detent-arm provided with an annular flange having a conical bore adapted to engage said pivot, said flange projecting outwardly from said arm and serving as a bearing on which the other of said legs is loosely mounted, a locking-nut holding said detent-arm and first-mentioned leg in frictional engagement and permitting free movement of said loosely-mounted leg, a stop on said loosely-mounted leg adapted for engagement with said detent-arm, a spring coiled about said annular flange said spring having leg portions extending upwardly from said flange, studs on said loosely-mounted leg adapted to be engaged by the legs of said spring, and a pin secured on said loosely-mounted leg adapted to operate in the slot in said detent.

11. A measuring instrument or caliper comprising two adjustable companion measuring-legs, a pivot rigidly secured to one of said legs, a detent-arm mounted on said pivot, a locking-nut holding said detent-arm and said pivot in frictional engagement and permitting free and relatively extended movement of said loosely-mounted leg, and a stop on said loosely-mounted leg adapted to be engaged by said detent.

12. A measuring instrument or caliper comprising adjustable measuring-legs, a detent, means for locking said detent and one of said legs together and permitting free and relatively extended movement of the remaining leg, and means holding said freely-moving leg in yielding engagement with said detent.

In testimony whereof we affix our signatures in presence of two witnesses.

EMIL KÖHLER.
RICHARD PETZOLD.

Witnesses:
MORRIS LIPMAN,
FREDERICK J. SIETZMAN.